L. A. PAGE.
TIRE CASING.
APPLICATION FILED JULY 15, 1918.
1,292,961.
Patented Jan. 28, 1919.
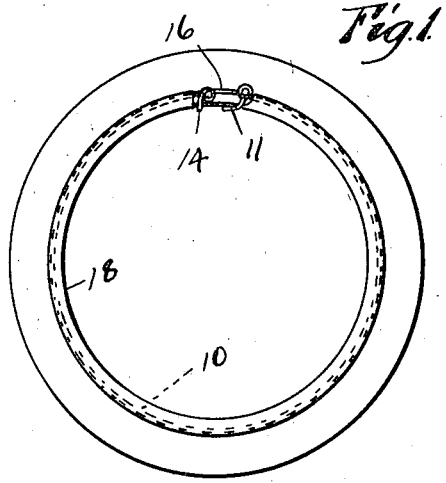
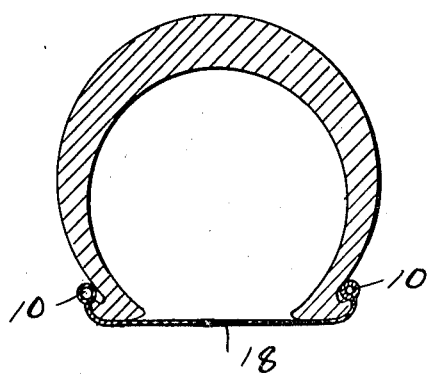
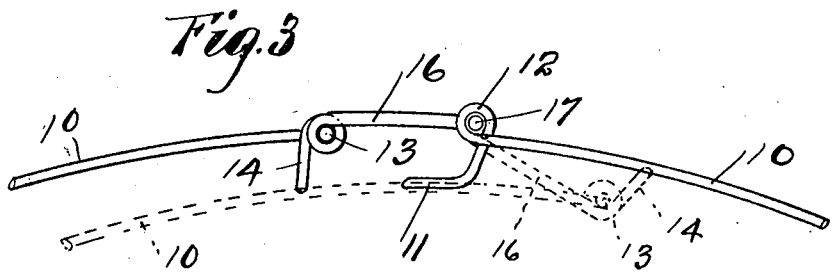
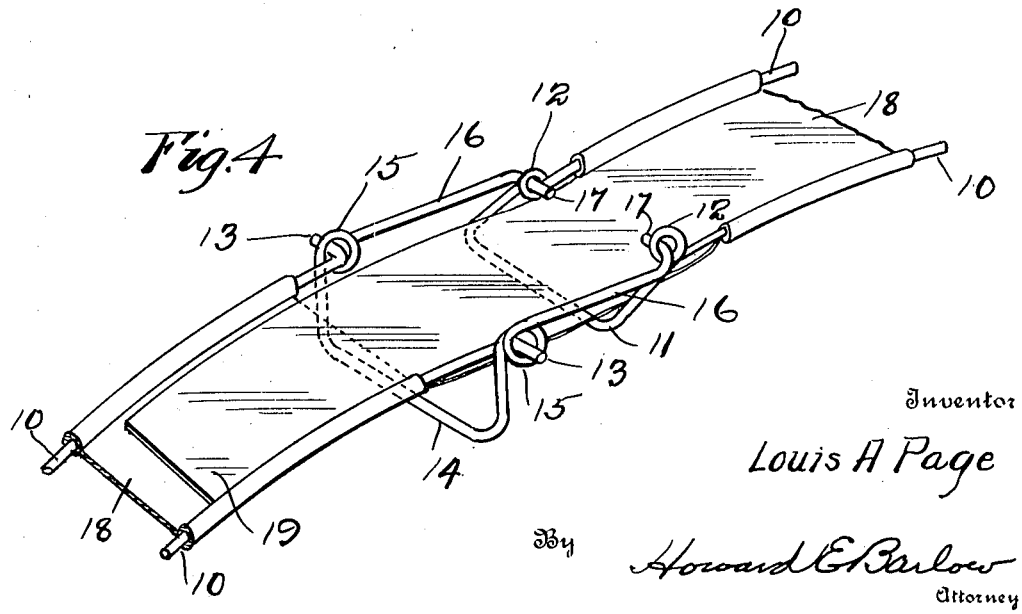
Inventor
Louis A Page
By Howard E Barlow
Attorney

UNITED STATES PATENT OFFICE.

LOUIS A. PAGE, OF PROVIDENCE, RHODE ISLAND.

TIRE-CASING.

1,292,961.  Specification of Letters Patent.  Patented Jan. 28, 1919.

Application filed July 15, 1918. Serial No. 244,846.

*To all whom it may concern:*

Be it known that I, LOUIS A. PAGE, a citizen of the United States, and resident of the city of Providence, in the county of Providence and State of Rhode Island, have invented certain new and useful Improvements in Tire-Casings, of which the following is a specification.

This invention relates to tire casings, more particularly to that class designed to cover the inner edge of the tire and close the opening which communicates with the interior thereof; and the object of this invention is to provide a simple, inexpensive and practical device which may be readily applied to the inner edge of the tire to exclude foreign matter such as rain, dirt and the like from getting into an unmounted tire while being carried as an extra on an automobile.

With these and other objects in view, the invention consists of certain novel features of construction, as will be more fully described, and particularly pointed out in the appended claims.

In the accompanying drawings:

Figure 1— is a side elevation illustrating my improved casing as applied to a tire.

Fig. 2— is a cross-sectional end view showing my improved casing as connected to two flexible bands positioned to engage the beads on the opposite edges of a tire.

Fig. 3— is a view showing the swinging connector member which serves to expand the bands to engage opposite edges of the tire and lock the cover in position thereon; also showing by dotted lines how the bands may be contracted to be readily removed from the tire.

Fig. 4— is a perspective view illustrating the general arrangement of the swinging joint or connector member; also showing the lip or flap of the closing strip positioned to cover the space across the joint.

Referring to the drawings, 10 designates the two opposite retaining bands preferably formed of wire and bent in hoop form, the same being spaced apart a distance a little greater than the opposite beaded edges of an automobile tire.

These flexible bands are preferably formed by bending a length of wire at its middle forming a bridge portion 11 between the two parts. A little back of this bridge portion each band is bent to form eyes 12, the two bands are then bent around in a circle substantially the size of the tire at the bead to be engaged, the opposite ends 13 of each band portion then being bent outwardly in opposite directions as best illustrated in Fig. 4.

In order to provide a simple, practical, inexpensive and effective means for contracting and expanding this pair of flexible bands, I have connected them by a joint member which is formed by bending a short length of wire substantially upon itself forming a bridge portion 14. A little back of the bridge portion each of the arms is bent to form an eye 15 through which the ends 13 of the bands project, the short arms 16 of the connector are then bent at substantially a right angle to the loop portion and are provided with inwardly-turned ends 17 which project through the eyes 12 in the bands.

To these wire bands 10 I have connected the opposite edges of a strip of flexible, moisture-resisting material such as rubberized cloth or the like, the opposite edges of which are preferably sewed, cemented or otherwise connected all around these bands. At the point where the connector member joins the opposite ends of these bands together, I have provided a flap or tongue 19 on the fabric, which is of sufficient length to extend across and close the opening caused by the insertion of the connector member and so render the whole casing sufficiently tight to exclude foreign matter.

When it is desired to contract these bands, this connector member is swung inwardly on its ends 17 into the position illustrated in dotted lines in Fig. 3. When positioned inside of a tire it is only necessary to swing this connector member backward into the position illustrated in full lines in Fig. 3, which serves to expand the bands and draw the strip 18 of flexible covering material around and across the inner surface of the tire, as shown in Fig. 2, thus completely closing the opening thereinto and protecting it against any possibility of foreign matter getting in to injure or destroy the inner surface thereof.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A casing for tires comprising a pair of concentric flexible bands spaced apart to fit about the opposite beaded parts of the tire, a flexible strip of material of a width to fit across the inner edge of the tire connected to said opposite bands, and means for reducing the diameter of said bands to facilitate positioning them on a tire and subsequently expanding them to engage opposite edges of the tire.

2. A tire casing comprising a pair of concentric flexible wire bands spaced apart a distance substantially equal to the width of the tire at the beads to be engaged, a strip of fabric having its opposite edges secured to said bands, a connector member joining the opposite ends of said bands, said member being joined to said band ends whereby an inward movement of said connector serves to reduce the diameter of said bands permitting it to be positioned on the tire and when swung outward to enlarge the bands to a size greater than the inner diameter of the tire to be engaged to retain the casing on the tire and cover the opening thereinto.

In testimony whereof I affix my signature in presence of a witness.

LOUIS A. PAGE.

Witness:
HOWARD E. BARLOW.